(12) United States Patent
Anderson et al.

(10) Patent No.: US 11,838,094 B1
(45) Date of Patent: Dec. 5, 2023

(54) REPEATERS FOR USE IN A HOSTILE ENVIRONMENT

(71) Applicant: Gov of the US as Rep by the Secy of the Air Force, WPAFB, OH (US)

(72) Inventors: Joseph Anderson, Edwards, CA (US); Nicholas Black, Charlotte, NC (US); Michael Anderson, Colorado Springs, CO (US)

(73) Assignee: United States of America as represented by the Secretary of the Air Force, Wright-Patterson AFB, OH (US)

(*) Notice: Subject to any disclaimer, the term of this patent is extended or adjusted under 35 U.S.C. 154(b) by 156 days.

(21) Appl. No.: 17/656,175

(22) Filed: Mar. 23, 2022

Related U.S. Application Data

(60) Provisional application No. 63/298,489, filed on Jan. 11, 2022.

(51) Int. Cl.
| | |
|---|---|
| *H04B 7/15* | (2006.01) |
| *H04B 7/26* | (2006.01) |
| *H04B 7/155* | (2006.01) |

(52) U.S. Cl.
CPC ........... *H04B 7/155* (2013.01); *H04B 7/2606* (2013.01)

(58) Field of Classification Search
CPC ...... H04B 7/15; H04B 7/155; H04B 7/15507; H04B 7/26; H04B 7/2606
See application file for complete search history.

(56) References Cited

U.S. PATENT DOCUMENTS

| | | | |
|---|---|---|---|
| RE35,375 E | 11/1996 | Park | |
| 8,294,333 B2 | 10/2012 | Salomon | |
| 9,211,648 B2* | 12/2015 | Grinstead | G05D 1/0022 |
| 10,903,894 B1* | 1/2021 | Dash | H04L 5/006 |
| 2008/0078865 A1 | 4/2008 | Burne | |
| 2011/0028069 A1 | 2/2011 | Norman | |
| 2012/0100777 A1 | 4/2012 | Hsu | |
| 2020/0021354 A1* | 1/2020 | Ashworth | H01Q 1/3216 |
| 2021/0037497 A1* | 2/2021 | Rueckert | H04W 76/10 |

FOREIGN PATENT DOCUMENTS

| | | | | |
|---|---|---|---|---|
| CN | 107690832 A | * | 2/2018 | ............. H04B 7/155 |
| CN | 111688827 A | * | 9/2020 | |
| CN | 216217334 U | * | 4/2022 | |

\* cited by examiner

*Primary Examiner* — Blane J Jackson
(74) *Attorney, Agent, or Firm* — AFMCLO/JAZ; Larry L. Huston

(57) ABSTRACT

A repeater for maintaining wireless line of sight communications. The repeater is autonomously repositional in both absolute location and azimuthal orientation. The repeater has at least two vibratory motors, or other vibration sources, which provide oscillations to depending legs against a support surface. By selectively operating one or more of the vibration sources together or independently, the repeater may be moved as helpful to maintain line of sight communication with another repeater or other operational hardware. A command signal from a remote base station controls the locomotion of the repeater to provide both a change in absolute position relative to the surroundings and a rotational change in azimuthal orientation as necessary to maintain communication under dynamic conditions.

20 Claims, 15 Drawing Sheets

REPEATERS FOR USE IN A HOSTILE ENVIRONMENT

CROSS REFERENCE TO RELATED APPLICATION

This application claims priority to and the benefit of U.S. provisional application Ser. No. 63/298,489 filed Jan.11, 2022, the disclosure of which is incorporated herein by reference.

STATEMENT OF GOVERNMENT INTEREST

The invention described herein may be manufactured and used by and for any governmental purpose without the payment of any royalty.

FIELD OF THE INVENTION

This invention is directed to repeaters which can be autonomously repositioned upon receipt of a command signal and more particularly to such repeaters having dual mode vibration for locomotion.

BACKGROUND OF THE INVENTION

Hostile environments can present significant communication challenges, whether indoors or outdoors. Oftentimes a forward agent viewing, recording or engaged with a hostile actor or hostile situation posing a threat must communicate in real time with command personnel operating at a base station. Such communications typically use wireless signals which rely upon line of sight communications. But if walls, stairs, boulders, tunnels, large vehicles, debris, etc. obstruct the line of sight, communication is lost. Furthermore, an explosion or deliberate disruption may terminate communication from a previously established and operable network. For example, cellular signals may not reach the depths of a building or cellular towers may be rendered inoperable by hostile actors.

Pre-installing repeaters between the base station and the forward agent directly engaged with the threat is infeasible. Electromagnetic interference may require repositioning of the repeaters. Either the forward agent and/or the threat may change position or relocate to a previously unknown position.

The forward agent may be a robot, person or drone. If the forward agent is a robot, dynamically installing repeaters in real time during advance towards the threat may be infeasible due to the weight penalty and limited maneuverability. If the forward agent is a person, installing repeaters during advance towards the threat may be infeasible due to the weight penalty and potential distraction from the mission. Wired systems are infeasible with either such type of forward agent for much the same reasons and catastrophic sabotage due to cutting the wire. If the forward agent is a drone, a wire connection is infeasible as potentially interfering with flight. A different approach is needed.

One attempt shown in U.S. Pat. No. 9,100,988 which deploys a mobile repeater system in a vehicle. But this attempt is infeasible for use indoors and does not provide for remote, dynamic adjustment of the repeater. U.S. Pat. No. 8,638,214 is directed to geolocating and is unhelpful for dynamic indoor situations. U.S. Pat. No. 11,157,021 uses a drone to check pre-progammed locations within a building for security, and is likewise unhelpful for dynamic hostile situations. U.S. Pat. No. 8,353,373 proposes an expensive network using multiple robots as radio relays, but does not provide for centralized control of the individual robots and can be cumbersome to deploy multiple robots in a congested environment.

A repeater which is deployed by an unmanned drone in a hostile environment may require subsequent repositioning due to suboptimal delivery or changing conditions. Wheels, tracks, and bipedal configurations require undue weight and large motors which require undue battery load. Prior art vibratory systems known to the inventors do not provide for the precise, controlled locomotion required to maintain optimal line of sight in the communication system.

The present invention seeks to overcome these problems using a dual mode vibration, whereby one or more vibratory inputs can be selectively applied, based upon a command signal.

SUMMARY OF THE INVENTION

The present invention comprises a repeater having locomotion based up vibratory input from two or more sources. The input may entail each of plural vibratory sources operating independently or simultaneously responsive to a command signal. Locomotion includes both a change in absolute position relative to the surroundings and a rotational change in azimuthal orientation.

DETAILED DESCRIPTION OF THE INVENTION

Figure 1:
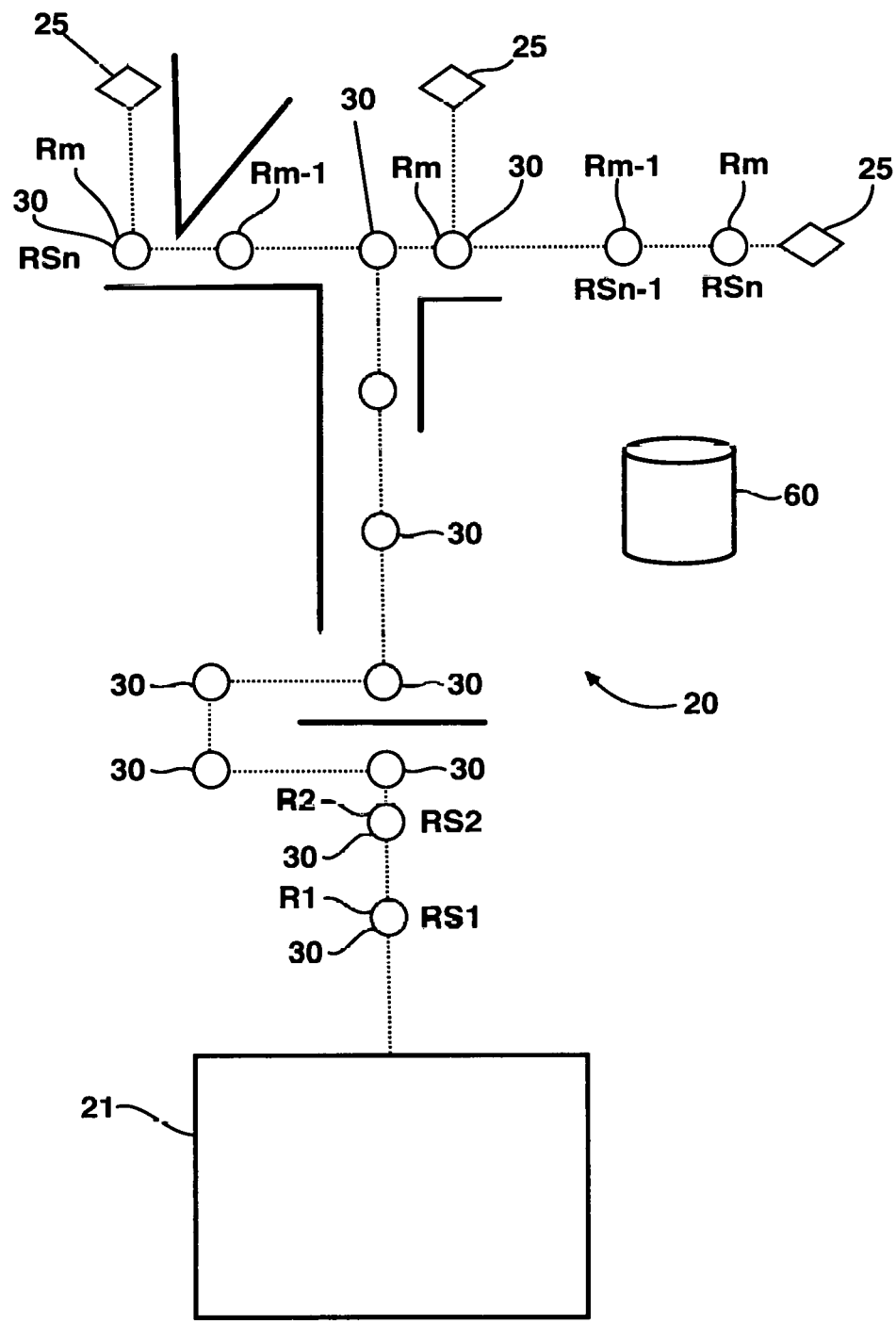
FIG. 1 is a top plan schematic view of a communication system according to the present invention having a branched path of repeater stations.

Referring to FIG. 1, a communication system 20 usable with the present invention comprises a base station 21, and at least one drone 60 in communication with the base station 21. The entire communication system 20 is portable, for use where a hostile environment may be present. By portable, it is meant that the entire communication system 20 may be assembled and rapidly deployed in different locations and various situations without undue infrastructure or site preparation.

The drone 60 may initially be in direct communication with the base station 21, and transition to communication through a plurality of dynamic, depositable, remotely controllable repeaters 30. The communication system 20 further communicates with at least one forward agent 25. The forward agent 25 may be a battery 36 powered autonomous or remotely controllable robot or a person. The forward agent 25 carries a transceiver 37. The transceiver 37 communicates signals to/from the base station 21 as described below. The signal from the base station 21 through a series of successive repeaters 30 to the drone 60 is referred to as a forward signal. The signal from the drone back through the repeaters 30 in reverse succession to the base station 21 is referred to as the return signal.

One or more operators may be functionally in control of the mission from the base station 21. The operators send the drone 60 from the base station 21 into the mission, it being understood that the drone 60 need not actually be at the base station 21 to be controlled from the base station 21.

The forward agent 25, particularly a robotic forward agent 25, may have any of or any combination of a microphone, speaker, video camera, thermal imaging camera, infrared camera, radiation detector, explosive detector, GPS, narcotics detector, thermometer, vibration detector, chemical/biological weapons detector, etc. collectively referred to as sensors. The return signal may comprise information and data gathered by the sensors, herein referred to as intelligence. The forward agent 25 forms no part of the claimed invention, except as may be specifically claimed below.

The base station 21 controls the operation of the drones 60 and the repeaters 30, and may be staffed by one or more operators or optionally be remotely controlled. The base station 21 is positioned in a safe location for the staff and can serve as the control center for operations. The base station 21 receives, and optionally records, real time wireless signals from the forward agent 25. The base station 21 may be disposed indoors or outdoors as the situation requires. The base station 21 dispatches the drone 60 from a secure location to advance towards the threat. The forward agent 25 may also be dispatched from the base station 21 or from another location.

Although a single drone 60 is described below, one of the skill will understand the communication system 20 is not so limited and may deploy a plurality of drones 60. The drone 60 has a dispensing assembly 70 for dispensing repeaters 30 at determinable locations. The drone 60 is controlled from the base station 21 and deposits repeaters 30 in a line of sight configuration as determined to be helpful or necessary during the operation. Repeaters 30 may be loaded onto the drone 60 at the base station 21 or loaded prior to arrival at the hostile environment. The location of repeater stations is not arbitrary, and may be determined by an operator in real time.

In operation, at least one operably maneuverable drone 60 carries a plurality of deliverable repeaters 30 from the base station 21 to a plurality of successive line of site repeater stations in turn and serially deposits a repeater 30 at each of the line of sight repeater stations from a first repeater 30 to a last repeater 30. Upon depletion of the payload of the plurality of repeaters 30, the drone 60 may return to the base station 21 for reloading with additional repeaters 30 as necessary. Alternatively or additionally, additional drones 60 may be used to deliver more repeaters 30, as needed. The plurality of repeaters 30 may comprise from 2 to 50 successive repeaters 30. The drone 60 may traverse the same path back and forth from the base station 21 to one or more points of interest or traverse different paths, as the changing circumstances may dictate.

The locations of the repeater stations are usually not predetermined, due to the unknown and changing conditions in a hostile environment. The repeater stations comprise a first repeater station RS1, and at least a second repeater station RS2, as deposited in order, until a nth repeater station RSn in direct communication with the forward agent 25 is established. Using this arrangement, either or both of the drone 60 and/or the forward agent 25 can wirelessly transmit a signal from a location of interest to the repeater 30 Rn at the nth repeater station Rn, closest to the site of interest. The signal is consecutively transmitted from the nth repeater 30 Rn to the next (n-1) repeater 30 Rn-1 at the next (n-1) repeater station RSn-1, and so on in turn, until signal is received by the first repeater 30 R1 located at the first repeater station RS1; and transmitted from the first repeater 30 R1 to the base station 21. Upon receipt at the base station 21, operator can interpret and act upon the signal. Appropriate actions may include transmitting a signal back to the forward agent 25. The signal may be transmitted from the base station 21 to the forward agent 25 by reversing this procedure.

The repeaters 30 bilaterally receive and transmit signals in a line of sight, through other repeaters 30 in order, between the ultimate destinations of the base station 21 and forward agent 25. As used herein a forward signal is transmitted from the base station 21 through one or more repeaters 30 to the forward agent 25. A return signal is transmitted from the forward agent 25 back through one or more repeaters 30 to the base station 21.

The repeaters 30 are deposited, in sequence, to form a line of sight communication from the forward agent 25 to the base station 21. The numbering scheme used herein is to designate the repeaters 30 in the order dispensed from R1, R2, R3 . . . Rm. R1 is the first repeater 30 to be deposited and is typically closest to the base station 21, R2 is the next repeater 30 to be deposited, in turn, until the last repeater 30 Rm is deposited closest to and in direct communication with the forward agent 25. The forward agent 25 transmits a return signal to repeater 30 Rm which, in turn, receives the return signal from the forward agent 25 and transmits the return signal, in turn, to repeater 30 Rm-1, which transmits the return signal to the next repeater 30 Rm-2 and so on until the signal is received at repeater 30 R1. The signal from repeater 30 R1 is then transmitted to the base station 21 for interpretation and analysis. Another signal may be transmitted from the base station 21 to repeater 30 R1 where it is received and transmitted to repeater 30 R2 and so on until the signal reaches repeater 30 Rm. Repeater 30 Rm then transmits the signal to the forward agent 25.

The repeaters 30 may be positioned as necessary to optimize signal transmission as described below. Positioning includes both disposal at a specific location within the hostile environment and azimuthal orientation at that location.

Figure 2:
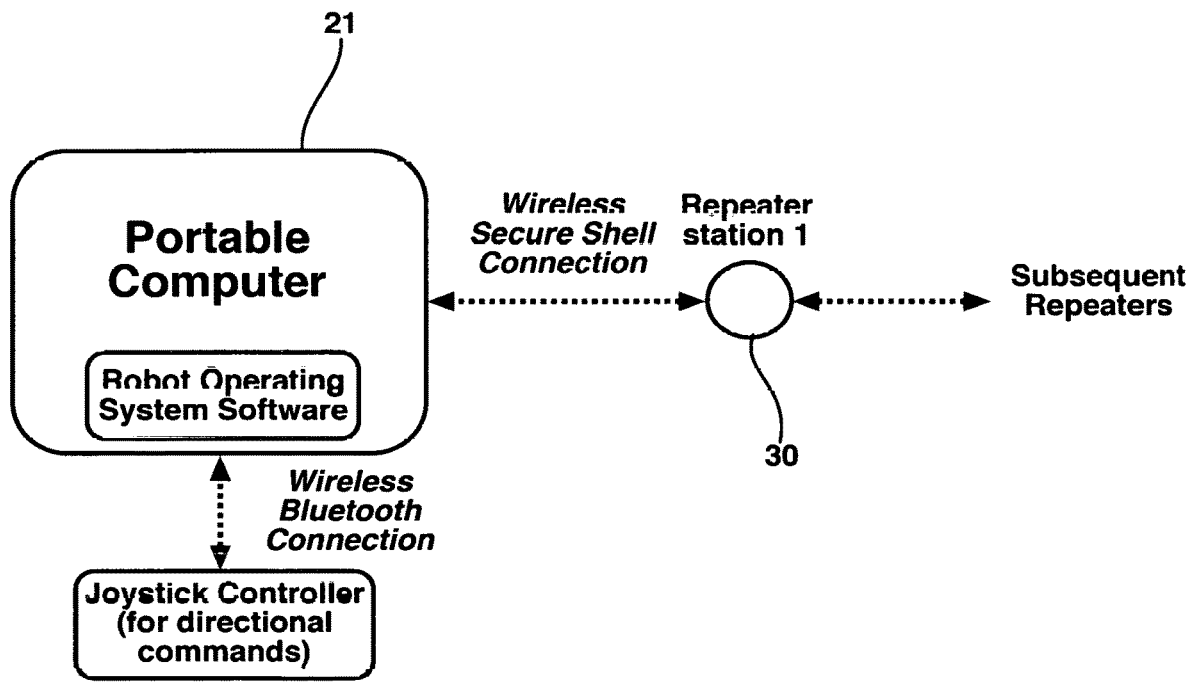
FIG. 2 is a block diagram of the base station hardware.

Referring to FIG. 2, the base station 21 may comprise a laptop, smartphone or other controller for receiving signals from the forward agent 25 and for converting the signals for audio/video display to one or more operators. The base station 21 further comprises a wireless network for communication with the drone 60, R/C transmitter and preferably a joystick for controlling the drone 60. If the forward agent 25 is a robot, the base station 21 has controls for maneuvering and otherwise operating the robot.

The base station 21 may comprise any mobile computing device such as a phone, tablet, laptop, etc. with adequate control software. The operating system preferably has at least 2 GB RAM and a processing speed of 1 GHz. A Hewlett Packard ZBook 17 G5laptop computer with the Linux Ubuntu operating system and Robot Operating System software has been found suitable.

The base station 21 can wirelessly connect to the forward agent's 25 on-board control computer via a secure shell (SSH) to remotely initiate autonomous control algorithms, display status messages, telemetry information, and/or retrieved intelligence information during the mission. The base station 21 may send direct control commands to the forward agent 25 in line of sight, but typically communicates through the repeaters 30. An operator can guide the exploration of the forward agent 25 by providing simple directional commands via an associated joystick. The joystick may connect to the base station 21 and multiple computing devices via a wired connection or wireless Bluetooth connection. Typical commands for the drone 60 include velocity requests forward/back, right/left, and/or up/down. These commands are relayed to the drone 60 on-board control computer via the repeater 30 network. The drone 60 on-board flight algorithms interpret these motion requests and convert the requests to the necessary motor 35 behaviors to move the drone 60 as desired. Typical commands for the repeaters 30 include driving a first motor 35, driving a second motor 35 and driving both motors 35. Plural repeaters 30 may be operably and functionally driven at the same time in response to command signals from the base station 21.

Figure 3:
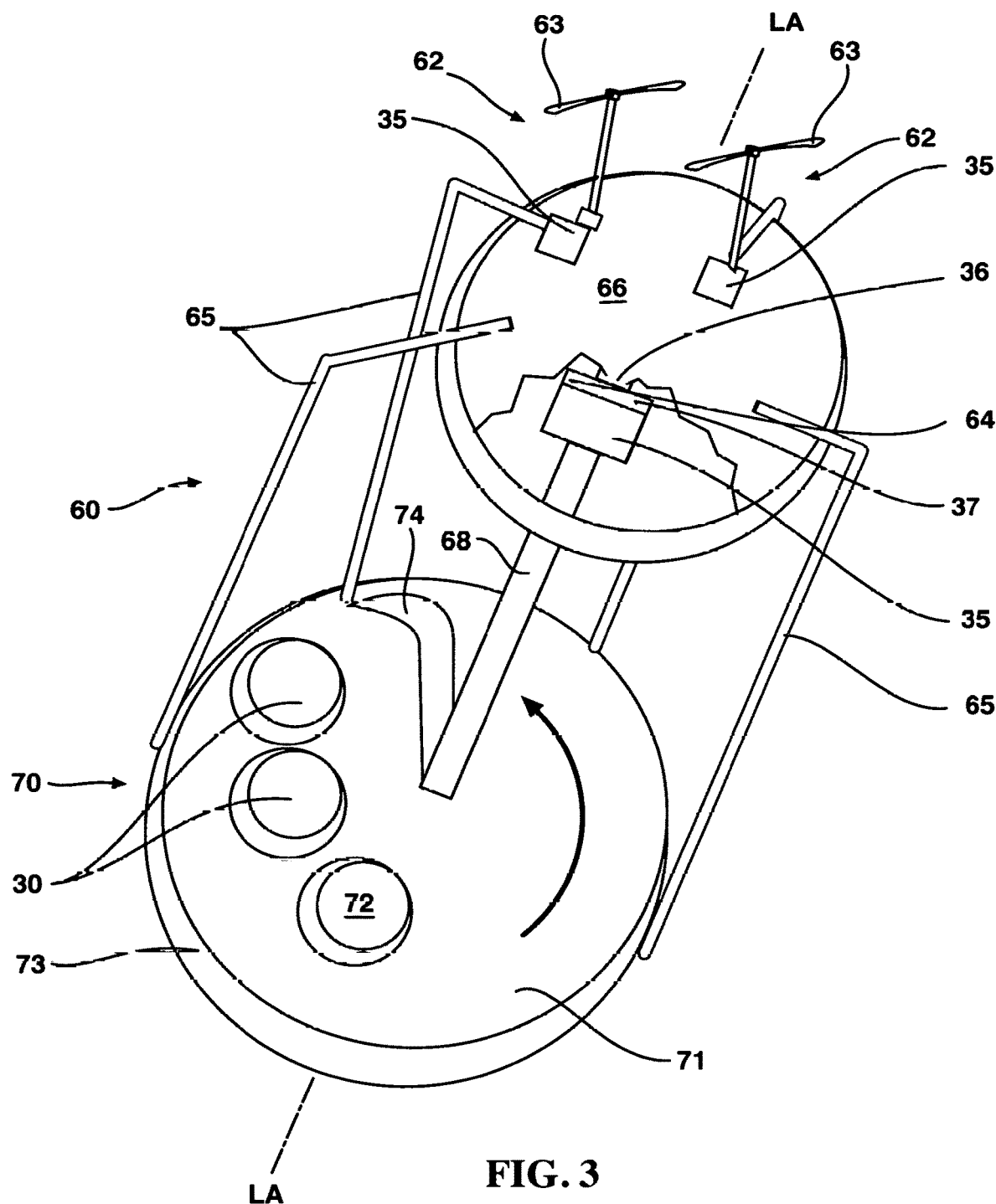
FIG. 3 is a schematic perspective view of a single tray quadrotor drone according to the present invention, shown partially in cutaway and having the two front rotors removed for clarity.

Referring to FIG. 3, the drone 60 may have one or more rotors 62, preferably four rotors 62, a battery 36, a flight controller 32F, an on-board companion computer 32C, a R/C receiver or transceiver 37, at least one dispensing assembly 70 as described below and a brushless motor 35 for each rotor 62. In an operational scenario, the on-board computer may be used for navigation, mapping, intelligence gathering, and further for positioning the repeaters 30, as described below.

The companion computer 32C is able to run Linux (Ubuntu LTS versions 16.04 or 18.04), ROS, or equivalent and has at least one USB port. Suitable companion computers 32C are preferably lightweight to conserve payload. The transceiver 37 has at least six channels, communicates over TCP and supports pulse position modulation/SBUS receivers.

Figure 4:
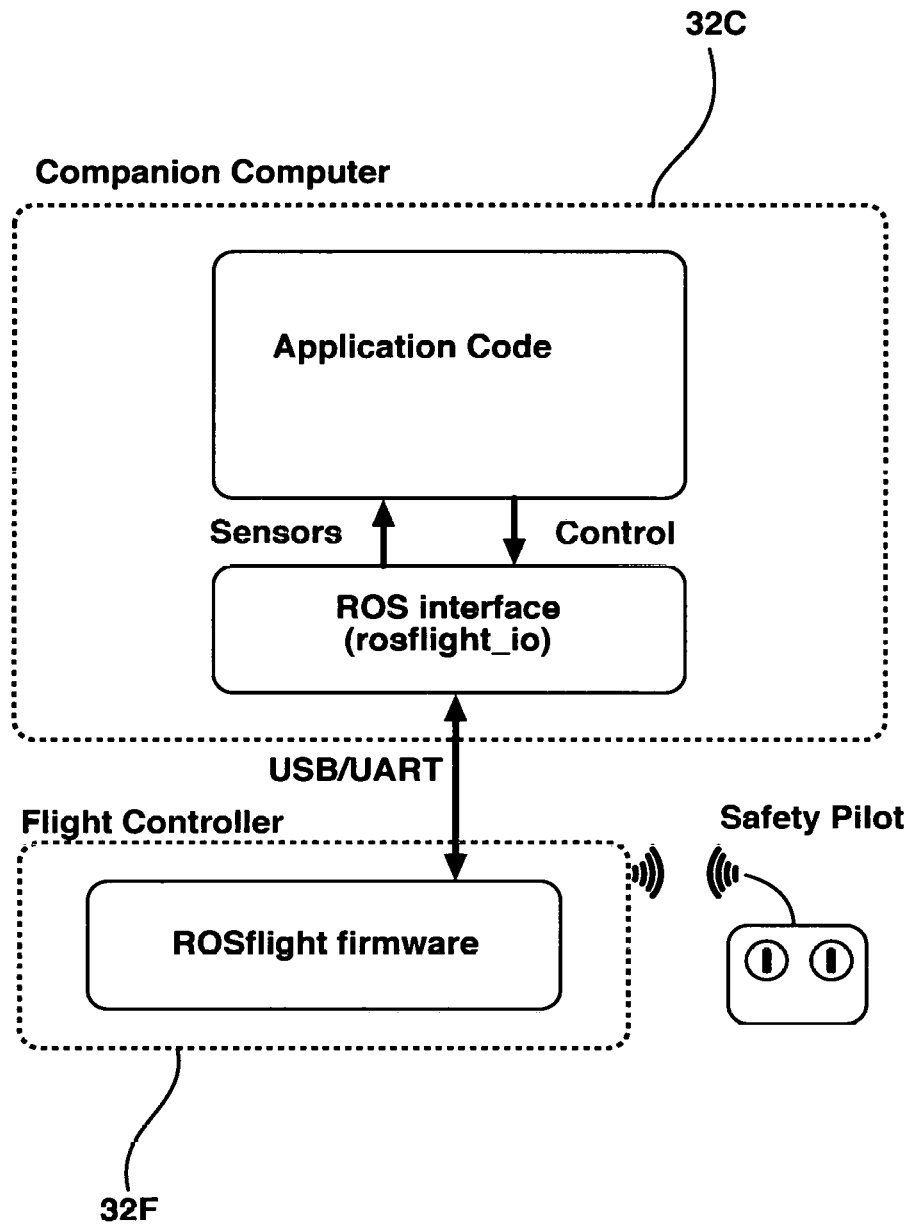
FIG. 4 is a block diagram of a flight controller for the drone.

Referring to FIG. 4 the flight controller 32F may have an embedded circuit board to run ROS flight firmware and perform I/O with the onboard sensors and ESCs. The flight controller 32F preferably has capability of at least 2000 degrees/second with a 3-axis MEMS gyro plus accelerometer with a 32 bit processor running at a speed of at least 72 MHz.

ROSflight, available from BYU MAGICC Lab, is used with a companion computer 32C mounted on the drone 60 and running ROS. The ROS interface is provided by a ROSflight io node. ROSflight packages are installed on both the companion computer 32C and a base station 21 computer. The companion computer 32C will run the node that communicates with the flight controller 32F over a serial connection. The base station 21 computer uses message and service definitions to call services or to subscribe and publish to topics.

Figure 5:
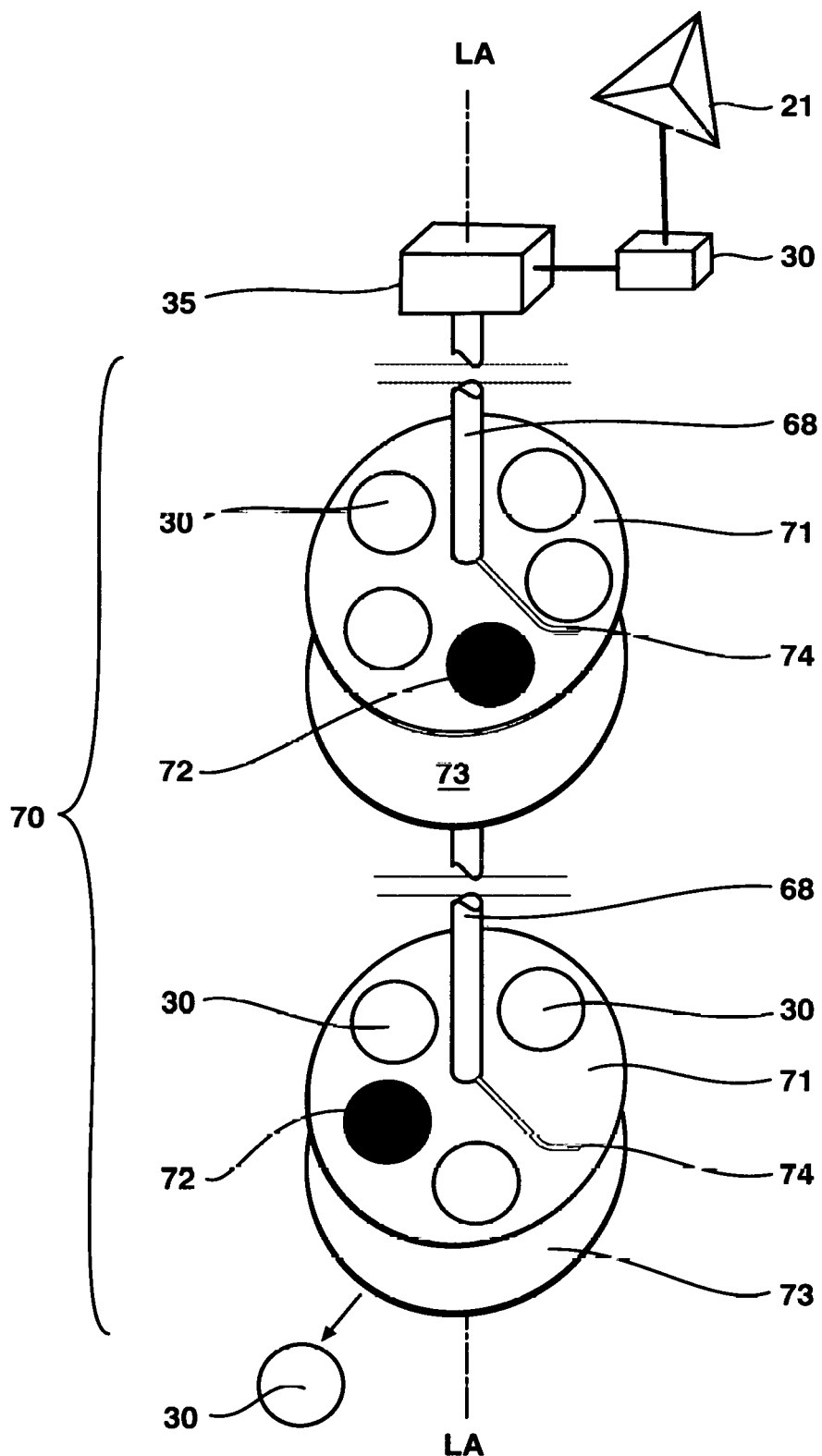
FIG. 5 is a schematic perspective view of a vertically stacked plural tray dispensing assembly according to the present invention.

Referring to FIG. 5, the drone 60 is unmanned and delivers one or more repeaters to a like number of remote repeater stations. Location selection for delivery of the repeater 30 to a repeater station typically occurs in real time as dictated from the base station 21. The drone 60 comprises a copter for flying the drone 60 from a first location to a second location. The drone 60 preferably has capability to travel without interruption from the base station 21 or a location nearby, to the forward agent 25 while carrying the plural repeater 30 payload described below.

The drone 60 has a frame 66 for joining at least one motor 35 and at least one rotor 62 for powering at least one propeller 63 in rotatably operable relationship with a dispensing assembly 70 for dispensing repeaters 30 therefrom. As discussed below, the dispensing assembly 70 is preferably disposed at the bottom of the drone 60 for simplicity and to prevent repeaters 30 from becoming entangled with other components upon dispensing.

The frame 66 may comprise at least one cross bar optionally holding three or more spaced apart depending legs 34 for resting upon the support surface and spacing the bottom tray 71 therefrom. An axially rotatable longitudinal shaft 68 is preferably concentrically centered on the frame 66 and depends from a cross bar of the frame 66 to define a longitudinal axis LA. Each rotatable propeller 63 is driven by a battery 36 powered propeller-motor 35 and is rotatable about a respective propeller axis. The rotatable shaft 68 is driven by a battery 36 powered shaft-motor 35. The drone 60 has at least one rotatable propeller 63, which is driven by a battery 36 powered motor 35. While a quadcopter style drone 60 is shown, the drone 60 may comprise any suitable numbers of copters, associated motors 35 and associated control system.

The dispensing assembly 70 is joined to the depending legs 34 for dispensing a plurality of repeaters 30 therefrom at determinable locations. The dispensing assembly preferably comprises at least one circular tray 71 concentric with the axially rotatable shaft 68 and adapted to carry a plurality of circumferentially spaced repeaters 30 thereon. The circular tray 71 has a central blind hole or through hole for accommodating the rotatable shaft 68. The shaft 68 is preferably rotatable driven by a dedicated shaft motor or may be driven from one or more of the of the propeller motors 35.

Figure 6A:
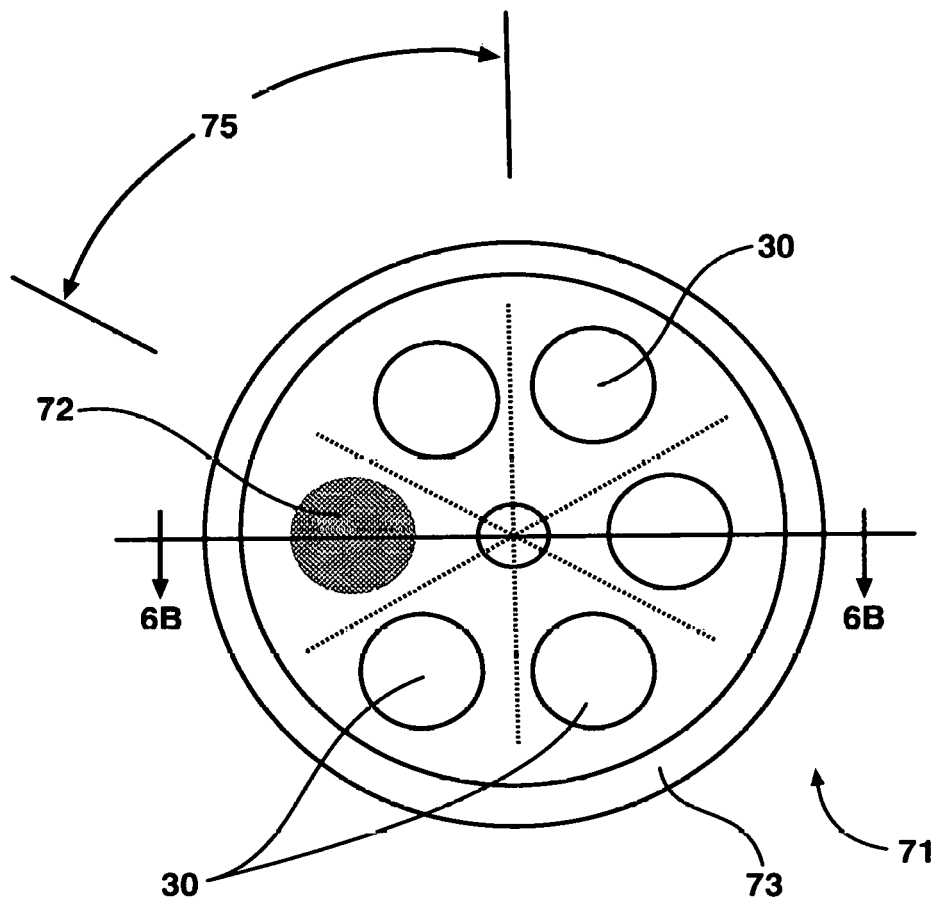
FIG. 6A is a top plan view of a six position tray having five repeaters thereon.
Figure 6B:
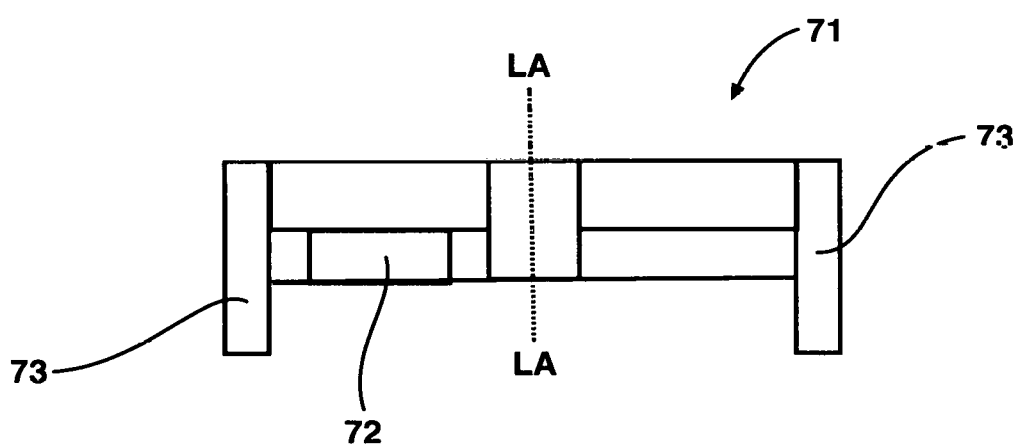
FIG. 6B is vertical sectional view of the tray of FIG. 6A, taken along line 6B-6B and omitting the repeaters for clarity.

Referring to FIG. 6A and FIG. 6B, the circular tray 71 further has a dispensing hole 72 therethrough for receiving and gravity dispensing a repeater 30 therethrough at a desired location and an upstanding lip 73 for retaining repeaters 30 within said tray 71 until dispensed through the dispensing hole 72. Plural repeaters 30 are circumferentially disposed on the tray 71 and constrained by the lip 73. The repeaters 30 are preferably round to reduce congestion during dispensing.

The drone 60 may comprise three or more struts 65, four struts 65 being shown, extending downwardly from the bottom of the lowest tray 71. Again, the struts 65 have a length in the longitudinal direction slightly greater than the thickness of the repeater 30, as taken in the longitudinal direction for landing. This arrangement similarly provides the benefit that the drone 60 may temporarily land at a location determined to be suitable for establishing a repeater station prior to stable and stationary delivery of the repeater 30. Alternatively, the drone 60 may hover slightly above the support surface while dispensing a repeater 30. This arrangement provides the benefit of being capable to dispense a repeater 30 onto a support surface unsuitable for landing due to debris, slope, sticky substances that may impede takeoff, etc. The dispensing hole 72 may subtend from 30 degrees to 120 degrees of the tray 71.

Figure 7:
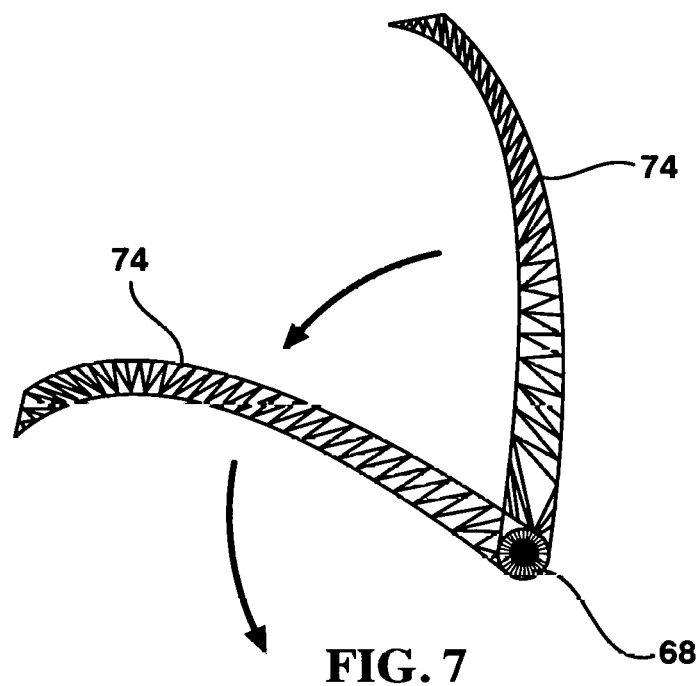
FIG. 7 is a scale top plan view of two counter-clockwise rotatable arms, vertically stacked for use with two vertically stacked trays.

Referring to FIG. 7, a radial arm 74 extends from a proximal end fixedly joined to the shaft 68 to a distal end juxtaposed with the lip 73. The shaft 68 rotates the arm 74 in response to rotational input from the shaft 68 motor 35. The radial arm 74 has a front side which is the direction of forward arm 74 rotation and a backside opposed thereto. In this embodiment, having the rotatable arm 74, the front side of the arm 74 contacts each repeater 30 to be dispensed in turn.

By way of nonlimiting example, if five repeaters 30 are circumferentially disposed on the tray 71, there are six total positions 75—one for each repeater 30 and one for the dispensing hole 72. Each position 75 of the tray 71 subtends 60 degrees and each index of the shaft 68 and arm 74 one position 75 would likewise subtend 60 degrees of forward rotation.

If the repeaters 30 have a diameter to height aspect ratio of about 1 to about 8, and preferably about 1.5 to about 5, prophetically unintended inversion during dispensing is reduced. A repeater 30 having a diameter of 7 centimeters and height of 4.5 centimeters has been found to work well without inversion when dispensed through a dispensing hole 72 having a diameter of 7.4 centimeters and a tray 71 having a diameter of 20.3 centimeters. If a non-round repeater 30 is used, the aspect ratio is taken as the ratio of the minor footprint dimension to the maximum thickness.

Furthermore, typical repeaters 30 have a heading angle and corresponding longitudinal axis RA which are preferably oriented to best transceive the signals. The repeaters 30 may be loaded onto the tray 71 with the heading angles in a predetermined orientation. With the structure of this invention, the repeaters 30 generally do not rotate about their own central axis during indexing and dispensing.

If desired, the tray 71 may have a circumferential upstanding tongue and the bottom of the repeater 30 may have a complementary groove into which the tongue is slidably and removably fitted during loading. This structure provides the benefit that as the repeater 30 is indexed around the tray 71, the heading angle of the longitudinal axis RA of the repeater 30 is known at all times. In another embodiment the tray 71 may have two groves, each concentric with the longitudinal axis LA. The grooves may be complementary to the legs 34 of the repeaters 30, so that the repeater 30 rides in the grooves until dispensed through the hole. This arrangement provides the further benefit that the repeater 30 can use the existing legs 34 for the dual purposes of positioning while in the tray 71 and locomotion after dispensing.

Figure 8:
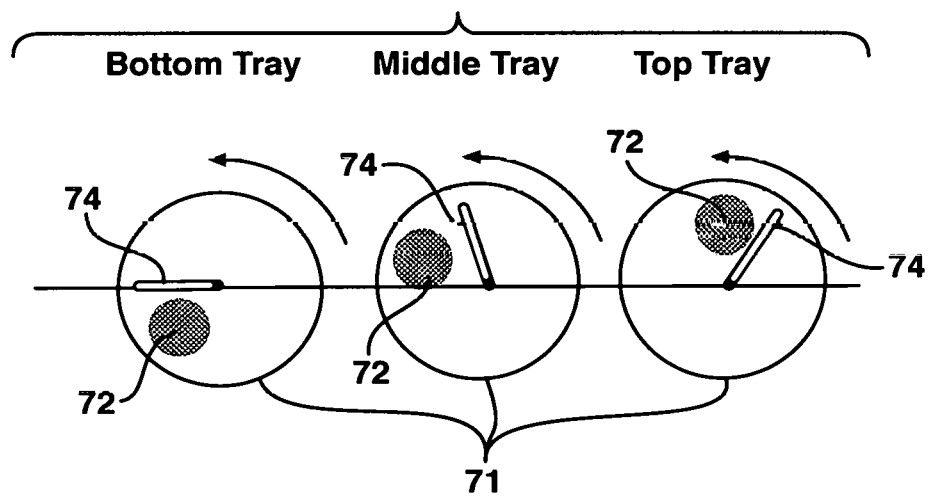
FIG. 8 is a schematic exploded top plan view of a three tray dispensing assembly.

Referring to FIG. 8 in a plural tray 71 embodiment the dispensing hole 72 on the first (top) tray 71 may be in a first circumferential position 75. The dispensing hole 72 of the first tray 71 is longitudinally (vertically) aligned with the last position 75 of the second tray 71. The dispensing hole 72 of each tray 71 is then vertically aligned with the last position 75 of the subjacent tray 71 so that maximum repeater 30 capacity is achieved for each tray 71.

For example, in a triple tray 71 embodiment having arms 74 which rotate counterclockwise in the forward direction, the dispensing hole 72 in the top tray 71 may be disposed at a first dispensing position 75. The dispensing hole 72 of the second tray 71 is preferably longitudinally aligned one position 75 counterclockwise relative to the hole of the first tray 71, to correspond to the last dispensing position 75 of the second tray 71 and maximize utilization of tray 71 capacity. The dispensing hole 72 of the third tray 71 is likewise aligned one position 75 counterclockwise relative to the hole of the second tray 71 and so on.

One of skill will understand that the repeaters 30 are likely dispensed in series with the first repeater 30 being closest to the base station 21, the second repeater 30 being dispensed in direct communication with the first repeater 30, etc. But one of skill will likewise recognize that the changing conditions of a hostile environment may dictate dispensing the repeaters 30 in a sequence out of order from the line of sight. The repeaters 30 may be mutually identical, providing the benefit of simplicity and economy of design. Alternatively, some of the repeaters 30 may be mutually different, providing the benefit that different repeaters 30 may be deployed as most suitable for a particular repeater 30 station during the mission.

Figure 9A:
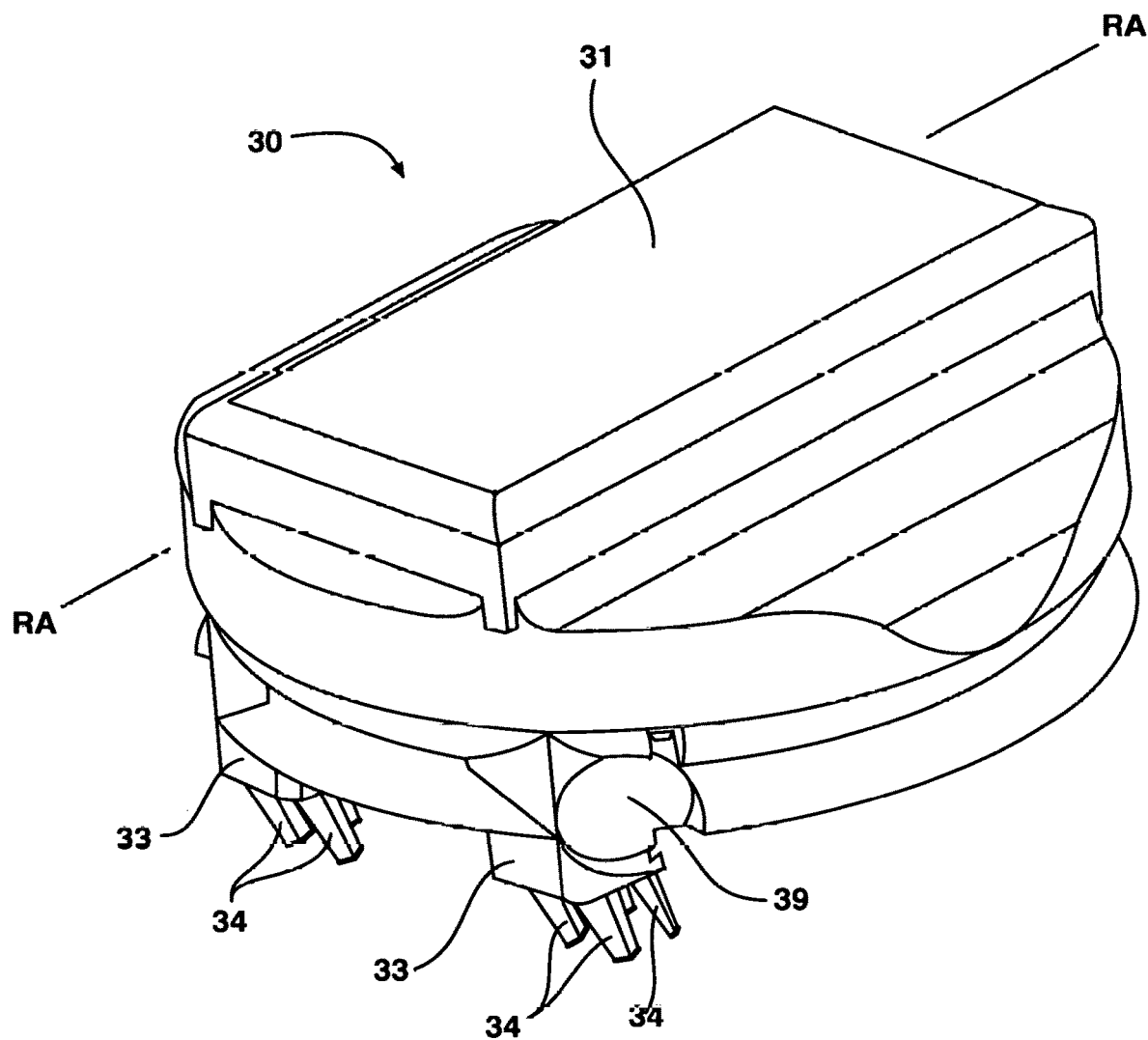
FIG. 9A is a top perspective view of a dynamically controllable repeater according to the present invention.
Figure 9B:
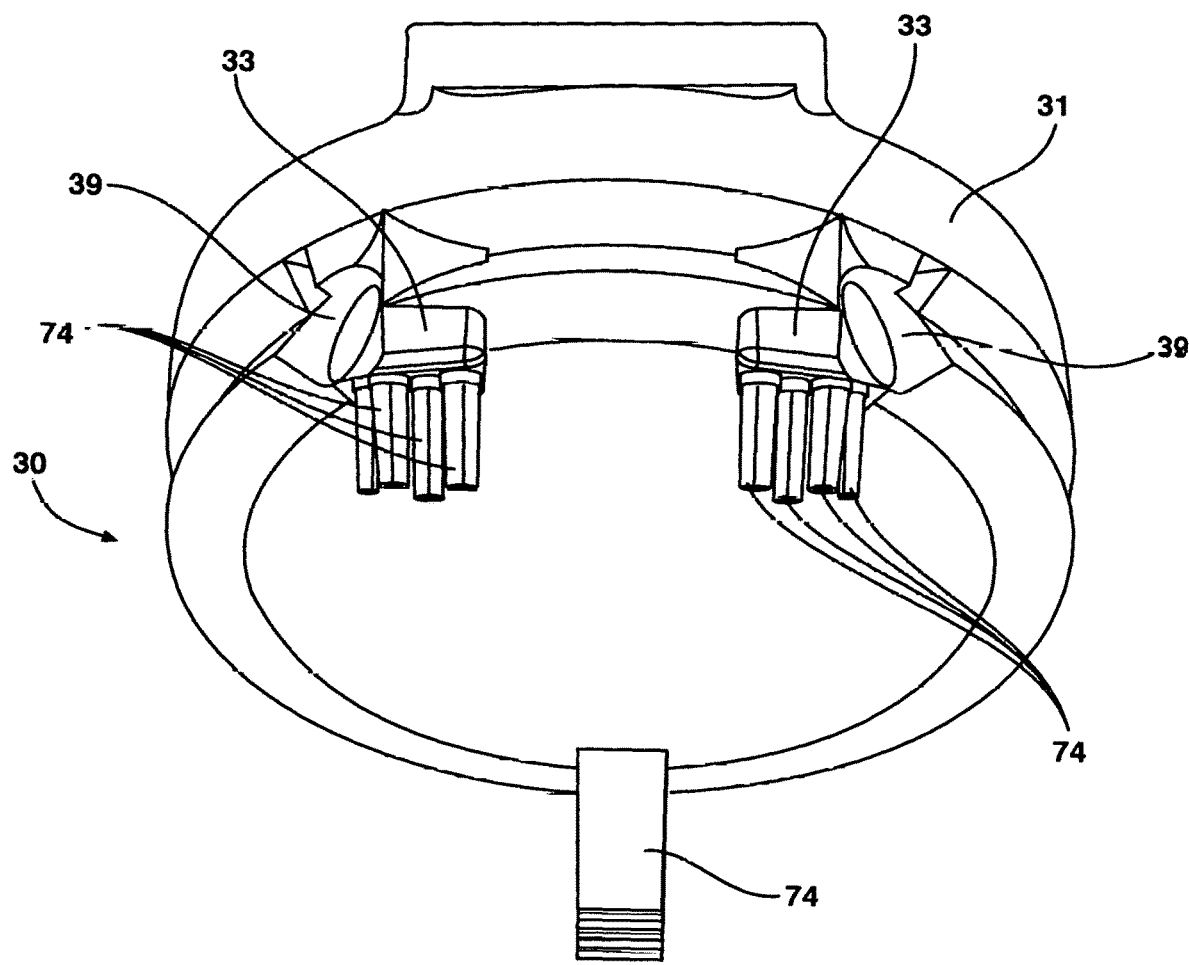
FIG. 9B is a bottom perspective view of the repeater of FIG. 9A, shown partially in cutaway.

Referring to FIG. 9A and FIG. 9B, each repeater 30 has a shell 31 defining a longitudinal axis RA and protectively enclosing a battery 36 powered transceiver 37 and microprocessor 64, which may be an integrated unit. The shell 31 functions as a frame 66, holding the components of the repeater 30 in fixed relationship for operation during the mission, particularly upon being delivered to a respective repeater station. The components of the repeater 30 may be adhesively joined to the shell 31 or be disposed in tight sockets complementary to the shape of the component.

The repeater shell 31 preferably has a round footprint to avoid misalignment during dispensing and enable maneuvering near a wall or other obstruction. The shell 31 may have an openable configuration for protectively encasing the microprocessor 64 and other components during use and for removal and restoration of components during maintenance. The shell 31 may be made of carbon fiber or any suitable plastic, such as Nylon, ABS or PVC.

The diameter of the shell 31 is complementary to the radial width of the tray 71, so that the repeater 30 may move in circular fashion to the dispensing hole 72. When the repeater 30 is loaded onto the tray 71, the longitudinal axis RA of the repeater 30 and longitudinal axis LA of the drone 60 are mutually perpendicular.

Figure 9C:
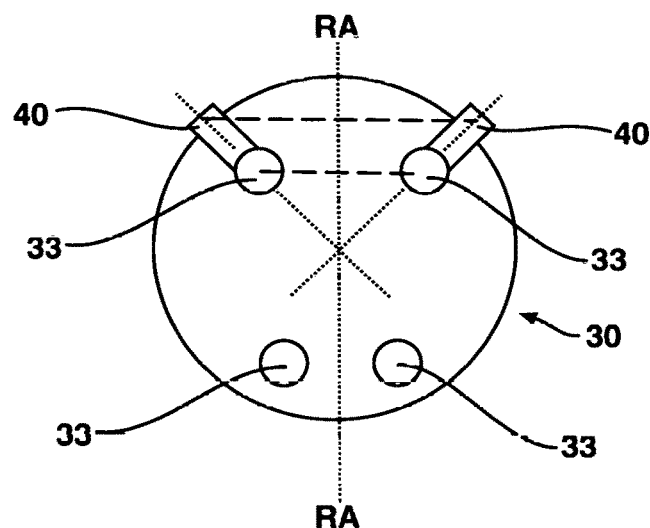
FIG. 9C is a schematic bottom plan view of the repeater of FIG. 9A.
Figure 9D:
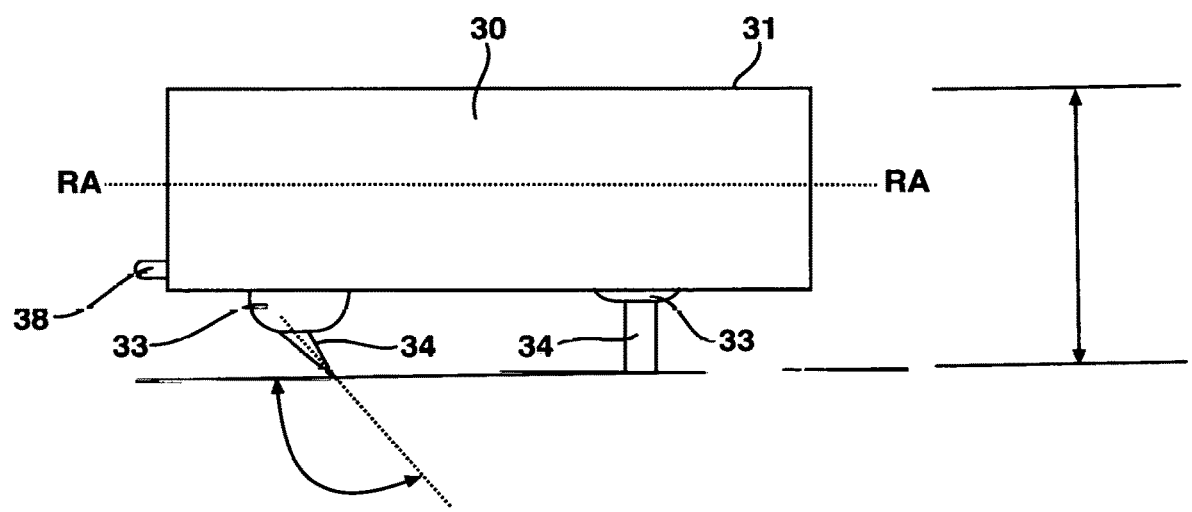
FIG. 9D is a schematic side elevational view of the repeater of FIG. 9A.

Referring to FIG. 9C and FIG. 9D, a pluralities of legs 34 depend from the bottom of the shell 31 to interface with the tray 71 of the drone 60. The legs 34 are cantilevered from a proximal end at the shell 31 and extend to a distal end which rests on a support surface, such as a floor or table. The powered legs 34 are preferably tapered to optimize the strength to weight ratio. At least the forward legs 34 are rearwardly angled to define a forward direction and rearward direction. The rear legs 34 of the repeater 30 may optionally be angled as well. The rearward angle of the legs 34 relative to the support surface provides a ratcheting affect for forward locomotion caused by oscillations of the legs 34 in response to vibrations induced by a respective vibratory motor 39.

The forward legs 34 may be rearwardly angled from about 16 to about 30 degrees, preferably about 20 to about 26 degrees and more preferably about 23 degrees relative to a horizontal support surface. A repeater 30 having two forward pods 33, each with four identical tapered legs 34, with the legs 34 rearwardly angled in the longitudinal direction 23 degrees and 9 mm long has been found suitable for a repeater 30 weighing 75 grams and having two vibratory motors 39 of approximately 0.25 watts each.

The legs 34 may be straight, as shown. Optionally the legs 34 may be curved so that induced vibrations may cause the legs 34 to deflect in the direction of curvature, prophetically improving locomotion. The distal ends of the legs 34 may optionally be rubber coated to provide friction against the support surface. The vibratory motors 39 or piezo devices, such a s piezoelectric crystal 40, may excite the forward legs 34 at a fundamental resonant frequency or a harmonic thereof, prophetically resulting in even greater locomotion.

The legs 34 are clustered into spaced apart pods 33, with each pod 33 comprising plural legs 34. The pods 33 of legs 34 may be distributed with two spaced forward pods 33 and a single rearward pod 33 defining a triangular configuration and preferably forming a planar triangle. For a circular repeater 30, the centroid of the two forward pods 33 defines a chord therebetween. The longitudinal axis RA of the repeater 30 is perpendicular to this chord. Plural forward pods 33 may be paired to preferably symmetrically straddle the longitudinal axis RA to provide for operational movement in any direction, particularly left-right movement relative to the longitudinal axis RA. While an embodiment having two forward pods 33 of four legs 34 is shown, one of skill will recognize the invention is not so limited. The repeater 30 may comprise any plurality of forward pods 33 of one or more legs 34, and one or more rearward pods 33 of one or more unpowered legs 34.

A single rearward unpowered leg 34 may be provided and comprise the rearward pod 33. The at least one rearward leg 34 may be generally perpendicular to the support surface or may be rearwardly oriented to assist with the ratcheting effect against the support surface. Legs 34 in the rearward pod 33 may be longitudinally aligned and coincident the longitudinal axis RA, disposed in a regular polygonal configuration or any other suitable configuration.

Figure 9E:
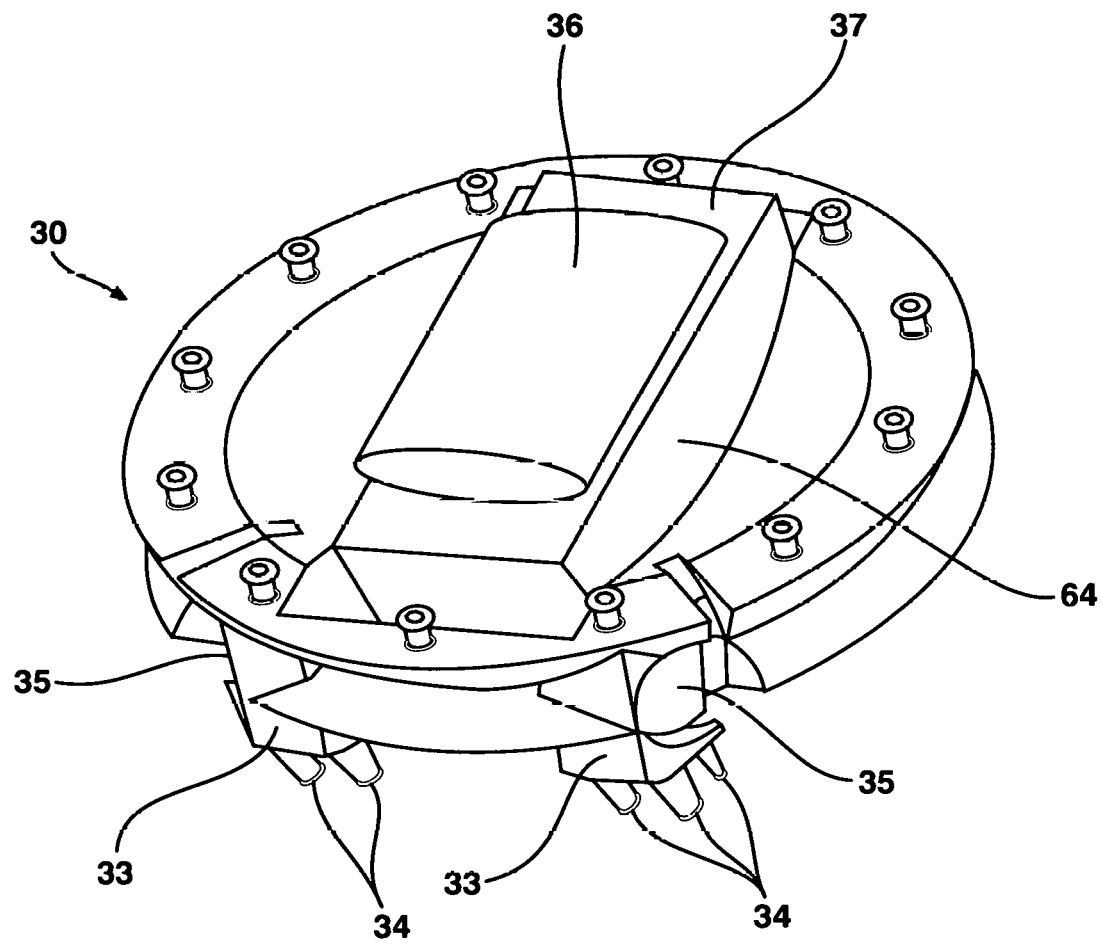
FIG. 9E is a top perspective view of the repeater of FIG. 9A, having the top removed for access to the internal components for maintenance.

Referring to FIG. 9E, a battery 36 powered vibratory motor 39 is operably associated with each forward pod 33 of legs 34. Each vibratory motor 39 is mounted near the proximal end of a respective forward pod 33 and has a rotatable shaft azimuthally angled relative to the longitudinal axis RA to form an included angle of about 30 to about degrees, preferably about 33 to about 41 degrees and more preferably about 37 degrees therebetween. The centroid of the shell 31 and the ends of the chord define an included angle ranging from 70 to 80 degrees. The shafts of the vibratory motors 39 are preferably, but not necessarily, parallel to the support surface with each vibratory motor 39 mounted directly over the respective leg 34.

The vibratory motor 39 and respective pod 33 comprising at least one leg 34 may be disposed in a common housing joined to the underside of the floor pan of the repeater The housing and floor pan are considered part of the shell 31 and may be formed integrally with other portions of the shell 31. This configuration provides for focus of the vibrations from the vibratory motor 39 to the legs 34, reducing damping by the repeater shell 31 and prophetically increasing efficiency.

One will understand the underside of the repeater 30 floor pan faces directly towards the support surface.

The vibratory motor 39 is preferably a DC button motor to conserve space, payload weight and power draw from the battery 36. The vibratory motor 39 may range from 2V to 5V, and is preferably about 3V providing from 0.1 to 0.6 watts, and preferably from 0.24 watts to 0.32 watts. Each vibratory motor 39 rotates an eccentric load at 1500 rpm to 20000 rpm to induce the vibrations at the associated pod 33 of legs 34. A BestTong rpm, 10 mm×2 mm flat button-type DC vibratory motor 39 has been found suitable. For a repeater 30 weighing about 70 to about 80 grams, this arrangement advantageously provides a power to weight ratio of about 3 to about 5 milliwatts/gram. Such an embodiment has advantageously provided for a repeater 30 which travels approximately 22 mm/sec with both vibratory motors 39 simultaneously driven.

Prophetically a piezoelectric device 40 may be used in addition to or in place of the eccentric load vibratory motor 39 to induce oscillations/vibrations in the legs 34. A piezoelectric device comprising a motor or piezoelectric crystal 40 prophetically provides the benefits of higher frequency vibrations for increased speed, and the further benefit of being able to select and tune a specific and precise vibration for a given repeater 30 geometry. A repeater 30 which travels at speeds of about 15 to about 30 mm/sec is believed to be suitable and not place undue power demands on the battery 36 with both vibratory motors 39 or both piezoelectric crystals 40 simultaneously driven.

If the two front vibratory motors 39 are simultaneously activated, the repeater 30 will move forward, substantially along the longitudinal axis RA. Activating only one vibratory motor 39 turns the repeater 30 towards the direction of the other, or still, vibratory motor 39. By selectively and independently activating the first vibratory motor 39 associated with the first legs 34 and/or the second vibratory motor 39 associated with the second legs 34 the repeater 30 can be advantageously and remotely maneuvered in the hostile environment. Maneuvering includes both a change in positional location and a rotational change in azimuthal angle. This arrangement provides for remote placement and orientation of the repeater 30 as may be helpful to maintain line of sight communication or avoid impending hostility.

One of skill will recognize that movement in any direction is subject to the slope of the support surface, debris, etc. Likewise one will recognize that any suitable number of pods 33 may be used in various embodiments. For example, a repeater 30 may have four pods 33 of legs 34, in a rectangular configuration. Each of the four pods 33 may have an associated means for inducing vibration independent of any other pod 33 to provide locomotion a desired direction.

In the prototype system, the base station 21 controls the repeaters 30 in an open loop control and commands that are sent to the repeaters 30 are expected to be correctly executed. The base station 21 registers the orientation of the repeater 30 and commands it to turn as necessary to advance in the desired direction. As the repeaters 30 move about, the base station 21 tracks where the repeaters 30 are located, based on the movements as commanded. Prophetically, the repeaters 30 may engage a sensor, such as a magnetic compass, to determine heading angle. The drone 60 preferably deposits each repeater 30 with a known heading, so that the communication system 20 may robustly track changes in position.

The microprocessor 64 and vibratory motors 39 are preferably powered by a common battery 36. A single cell 3.7 V Li-Po battery 36 is suitable for the embodiment described herein. Preferably the battery 36, microprocessor 64 and vibratory motors 39 are hardwired together.

The microprocessor 64 controls the signals to the vibratory motors 39 as desired to move the repeater 30 in order to optimize communication. The microprocessor 64 also controls receipt and transmission of signals between repeaters 30 through a WiFi chip. A WiFi mesh connects the repeaters 30 with a SSID so that a common code and network are available. The microprocessor 64 software may be written in Arduino C language. The microprocessor 64 may have a 3.3V regulator with 500 mA peak current output, CP2104 USB-Serial converter onboard with 921600 max baud rate at 80 MHz and 4 MB of FLASH (32 MBit). An Adafruit ESP8266 Feather Huzzah board has been found suitable.

The rearward pod 33 is not used for locomotion and may comprise a single leg 34 or plural legs 34. The leg 34 of the rearward pod 33 may be perpendicular to the support surface and be disposed on the longitudinal axis RA. The leg(s) 34 of the rearward pod 33 may be powered by a dedicated vibratory motor 39 or piezoelectric crystal 40, but are preferably unpowered.

A key performance metric is network signal strength. The position and orientation of the repeater 30 are the means to achieving a robust and adequate wireless network. The base station 21 can command a repeater 30 to move and assess whether the signal strength of the network improved or degraded and command the repeater 30 to move in the direction that improves the network signal processing.

Figure 9F:
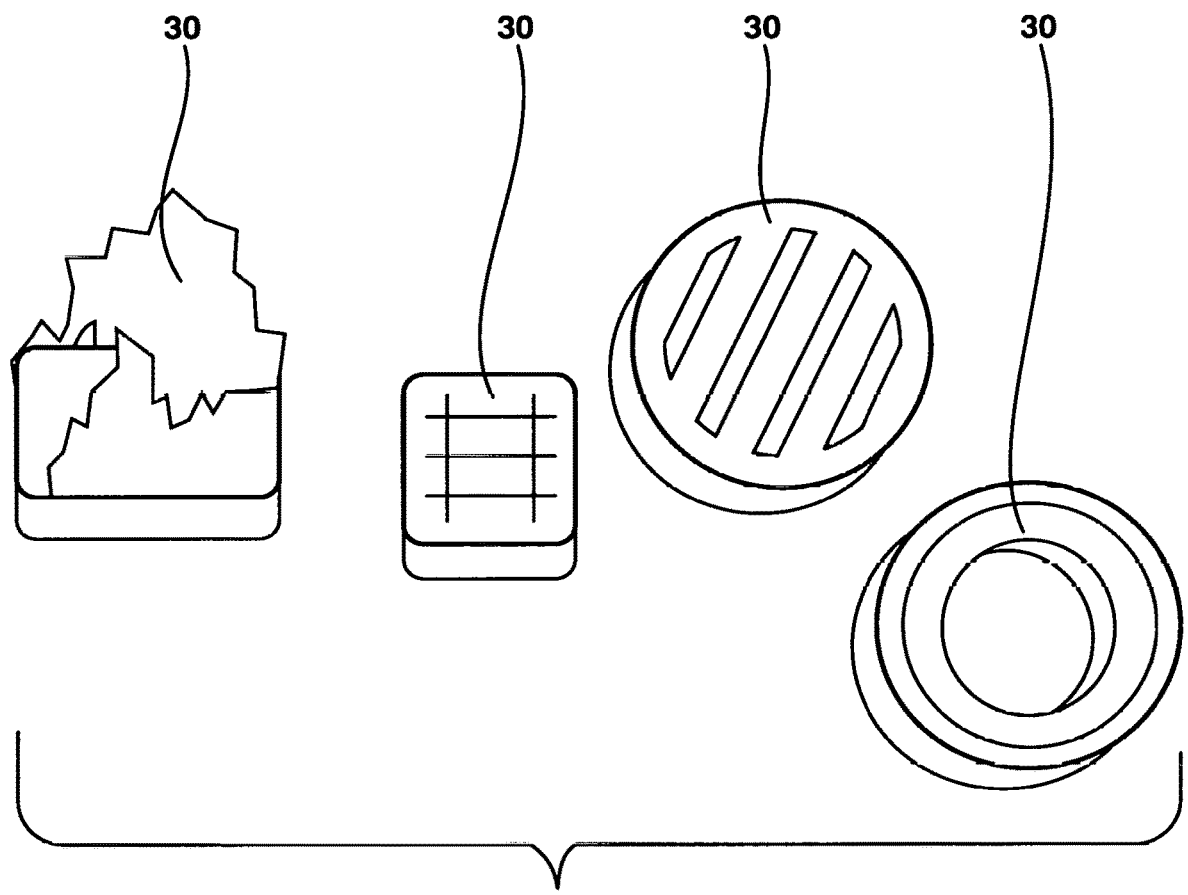
FIG. 9F is a schematic perspective view of various repeater shells.

Referring to FIG. 9F, the shell 31 of the repeater 30 may be aesthetically configured to resemble common items or backdrops which may be indigenous to or commonly found in the particular hostile environment under consideration. Such embodiments may be tailored to various scenarios expected to be encountered throughout the mission. This flexibility provides that the tray 71 may hold a plurality of like repeaters 30 or a selection of aesthetically different repeaters 30.

By way of non-limiting example from left to right, a first repeater 30 shell 31 may resemble a rock as might be found outside of the hostile environment and having a generally oval footprint. A second repeater 30 shell 31 may resemble a paver stone as may be found in landscaping juxtaposed outside a building and having a generally square footprint. Other repeater 30 shells 31 may resemble a common items found inside a building. For example, a third repeater 30 shell 31 may be disguised as a smoke detector and a fourth repeater shell may resemble a saucer as may be found inside a building of interest. If desired, one or more repeaters 30 may have lamps 38 for illumination of the immediate surroundings when the drone 60 or forward agent 25 are near. All of the repeaters 30 in the system may have shells 31 disguised as described herein or only a subset of the plurality of the repeaters 30 may have such a shell 31.

Figure 10A:
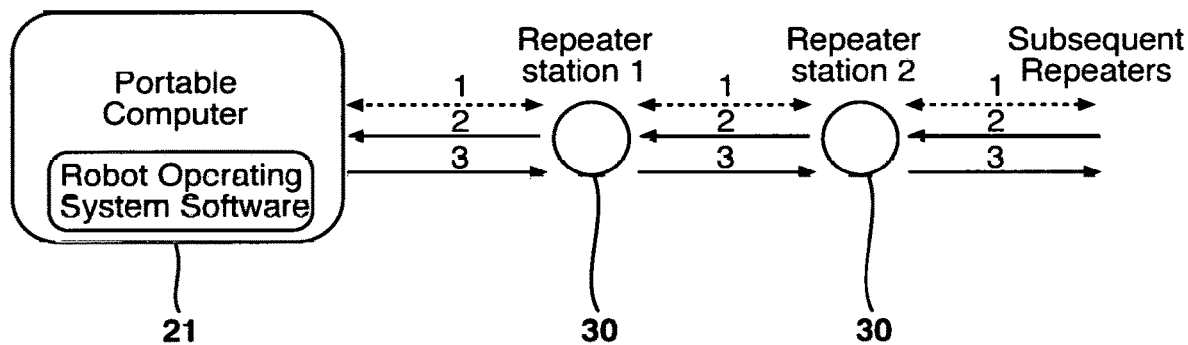
FIG. 10A is a block diagram of a control algorithm for the present invention.
Figure 10B:
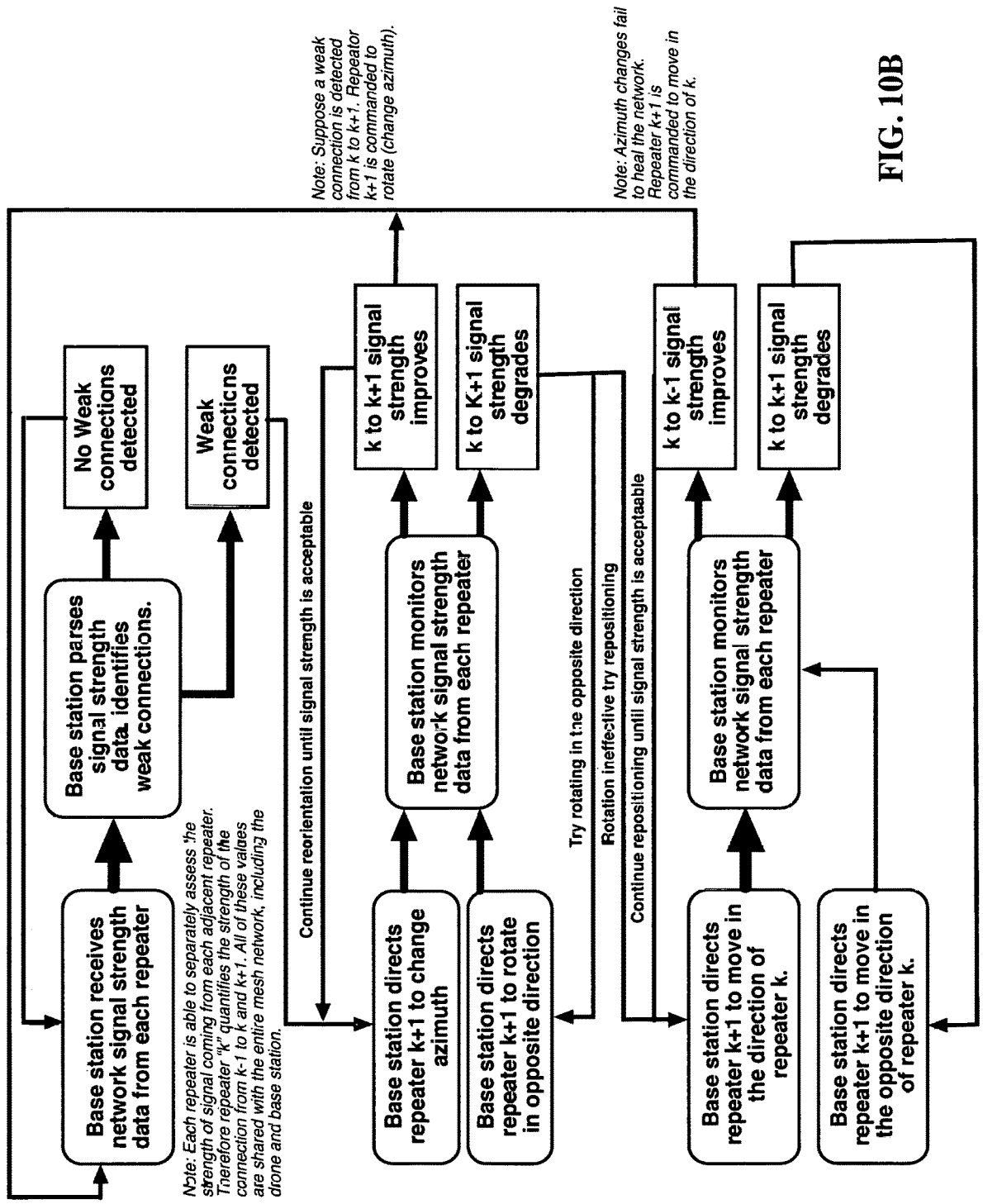
FIG. 10B is a flow chart of the control algorithm of FIG. 10A.

Referring to FIG. 10A and FIG. 10B, the control algorithm may reside on the base station 21, with repeater 30 placement commands being sent to the drone 60 through the wireless mesh network, as are any subsequent commands for the repeaters 30 to relocate. Commands from the base station 21 may be sent to the drone(s) 60 and repeater(s) 30 via a wireless signal having a frequency of 30 Hz to 300 GHz, and preferably having a Bluetooth frequency of 2.4 GHz or a frequency of 5 GHz.

Referring to FIG. 10B, the repeater 30 network control algorithm operates by continuously monitoring network signal strength between repeaters 30. Each repeater 30 separately assesses the strength of signal coming from both adjacent repeaters 30. Therefore, repeater 30 "k" quantifies the strength of the connection from k−1 to k and k to k+1. All of these values are continuously shared with the entire mesh network, including the drone 60 and the base station 21. In nominal operation, the base station 21 operates the repeater network control algorithm by evaluating the signal strength data it receives. In the event that a weak signal is detected between two nodes of the network, the base station 21 sends commands to the involved repeaters 30 to heal the network.

If a weak connection is detected between repeater 30 k and repeater 30 k+1 the algorithm first instructs repeater 30 k+1 to reorient the azimuth in an arbitrary direction. The base station 21 monitors the signal strength as the repeater 30 reorients. If the signal strength improves, the repeater 30 will be directed to continue moving until the network signal strength is satisfactory. If the signal strength degrades, the repeater 30 will be commanded to move in the opposite direction. If azimuth reorientation is ineffective, the base station 21 will command repeater 30 k+1 to change position, first by moving towards repeater 30 k, and if that is unsuccessful, then moving away from repeater 30 k. If these basic actions fail to improve the signal strength, other combinations of rotation and movement are undertaken, such as reorienting the repeater 30, then changing position or vice versa.

In an alternative embodiment, the algorithm may additionally reside on the drone 60 or on each of the base station 21, drone 60 and plurality of repeaters 30. In such embodiment, the success of the algorithm is not dependent upon an intact mesh network, as repeaters 30 could dynamically accommodate damage to the network by adjusting position, even if cut off from the base station 21. In this embodiment, the repeaters 30 initially take commands from the base station 21 algorithm as default. But if contact with the base station 21 is lost, as may be indicated by not receiving an occasional ping from the base station 21, the repeater 30 could revert to commands from its own algorithm.

In operation, as the drone 60 travels through the hostile environment using the algorithm, the drone 60 dispenses plural repeaters 30 at a like plurality of repeater stations according to two criteria: not to exceed maximum separation distance for that communication system 20 and at corners. Preferably, repeaters 30 are consecutively positioned at predetermined separation distances which range from 50 to 70 percent of the maximum wireless communication range between successive repeaters 30 for buffer. This range provides a safety margin in the mesh network, and allows for future self-healing of the network if a repeater 30 becomes inoperable. Spacing the repeaters 30 too close together may require excessive quantities of repeaters 30, complicating the mission. Spacing the repeaters 30 too far apart can jeopardize communications.

Additionally when a repeater 30 is dispensed when the drone 60 encounters a corner, in order to maintain line of sight between the successive repeaters 30. Recognition of corners is based upon threshold deviations in the movement of the drone 60 in an X-Y plane, indicating that the drone 60 is moving in a path having a vector component 90 degrees to the previous path, and has thus turned a corner. Stairs and other elevation changes may be recognized based upon threshold deviations in the Z direction, it being understood the X, Y and Z directions are mutually perpendicular.

The repeaters 30 may be disposed in a single series from the base station 21 to a first repeater station, to a second repeater station to a plurality of additional intermediate repeater stations and so on until the repeater 30 at the last repeater station is in communication with the forward agent 25. Optionally, the series of repeaters 30 may branch and provide two different and alternative paths from the base station 21 to the forward agent 25 for redundancy. Alternatively, the series of repeaters 30 may branch and lead to two or more forward agents 25 at two or more different locations in the hostile environment.

In the event of an unexpected repeater 30 failure, adjacent and nearby repeaters may be repositioned to accommodate. Alternatively, repeaters 30 may be positioned based upon attenuation of signal strength. The aforementioned buffer allows the repeaters 30 to reposition and still maintain communication with either adjacent repeater This capability advantageously prevents the entire network from collapse based upon a single point of failure.

Upon failure of a repeater 30, only those repeaters 30 between the base station 21 and the point of failure initiate a self-healing response. This arrangement allows an operator at the base station 21 to be able to constantly provide input to the communication system 20 as needed.

Upon detecting a fault at an intermediate repeater 30 between said first repeater and said nth repeater 30, the algorithm instructs the intermediate repeater 30 to first move in either the X direction or Y direction, whichever is greater in relation to the original position of the preceding repeater 30, to reestablish communication with the preceding repeater 30. The algorithm may then instruct the intermediate repeater 30 to azimuthally reorient to optimize the communication signal.

The first repeater 30 needs to only be programmed with its position upon delivery to the first repeater station RS1 and the position of the base station 21 to reposition and maintain an unbroken communication signal in the event of signal fault or undue attenuation. Each repeater 30 after the first repeater 30 need only be programmed with its own position and the position of the respective preceding repeater 30 to maintain communication if the original placement of that repeater 30, or dynamic conditions, provides a signal fault or undue attenuation. Therefore each repeater 30 may be dynamically programmed with its position only relative to a preceding repeater 30 or to the base station 21 as the case may be. This algorithm advantageously simplifies operations by obviating each repeater 30 to store values for its positions relative to the positions of every other repeater 30 in the network.

Figure 11A:
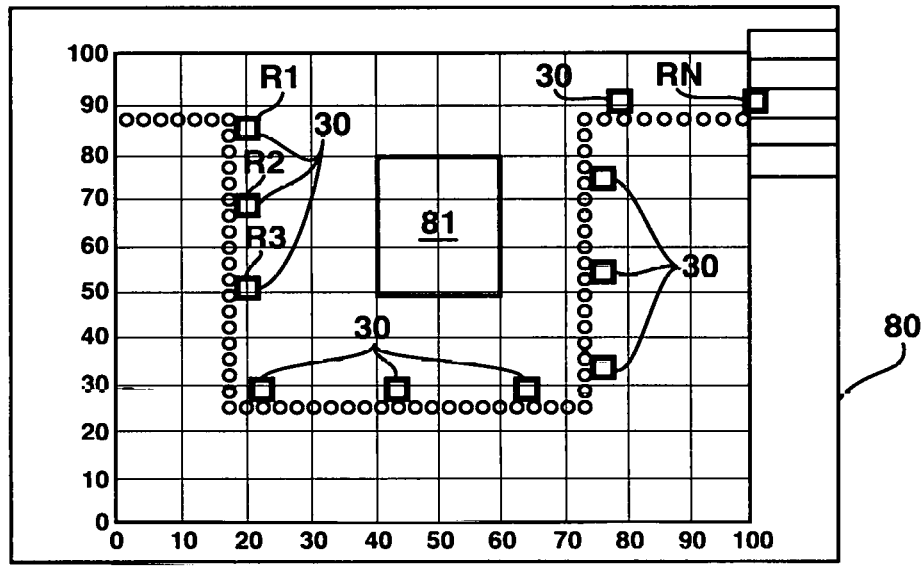
FIG. 11A is a simulation of a communication system according to the present invention showing a top plan view of the initial layout of the repeater stations.

Referring to FIG. 11A, Matlab software, available from The Mathworks Inc. of Natick, MA, has been found suitable for simulating repeater 30 positioning and repositioning in the event of signal failure. FIG. 11A shows a simulation 80 with initial simulated positions of 12 repeaters 30, R1, R2, R3 . . . Rn. The positions of the repeaters 30 compensate for an obstruction 81 in the middle of the simulation 80 field. The obstruction 81 may be debris, a plurality of corners, etc. A failure of repeater 30 R3 is assumed.

Figure 11B:
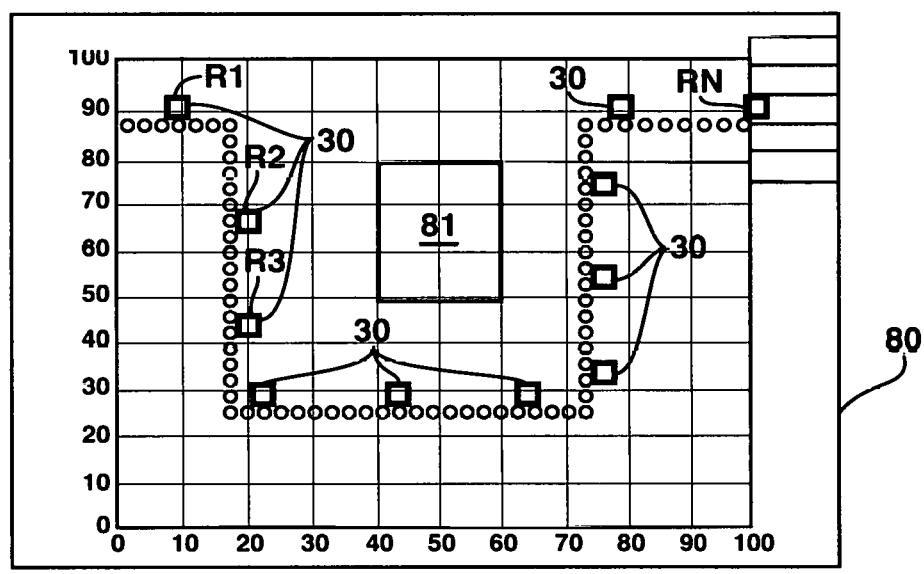
FIG. 11B is a simulation of a communication system according to the present invention showing a top plan view of the revised layout of the repeater stations, after adaptation.

Referring to FIG. 11B, the simulation 80 compensates for the failure of repeater 30 R3 by adjusting the positions of repeaters 30 R1 and R2 through command signals. The simulation 80 shows adjustment of downstream repeaters 30 is not needed to maintain communication from repeater 30 R1 to repeater 30 Rn.

In another embodiment the invention comprises a non-transitory computer readable medium suitable for and configured to carry out the computations and determinations of any of the foregoing, including only as limited by the claims below, algorithms, calculations, estimates such as but not limited to Kalman estimates, iterative/recursive exercises, solving of equations/inequalities and determinations of any of the parameters listed in the claims below.

Exemplary non-transitory computer readable media according to the present invention are physical, transferable, reproducible, may comprise all computer readable media except for a transitory propagating signal and particularly include flash drives, CD's, DVDs, internal/external hard drives, more particularly internal/external solid state hard drives, and further exclude RAM, volatile memory requiring power for data storage, signals and effervescent carrier waves. In an alternative embodiment, transitory computer readable media may also be used.

To the extent that the figures illustrate diagrams of the functional blocks of the various embodiments, the functional blocks are not necessarily indicative of the division between hardware circuitry. Thus, for example, one or more of the functional blocks (e.g., processors or memories) may be implemented in a single piece of hardware (e.g., a signal processor or a block of random access memory, hard disk, or the like) or multiple pieces of hardware. Similarly, the programs may be standalone programs, may be incorporated as subroutines in an operating system, may be functions in an installed software package, and the like. The upper limit of any range may be combined with the lower limit of any range for that same parameter and vice versa. It should be understood that the various embodiments are not limited to the arrangements and instrumentality shown in the drawings.

What is claimed is:

1. A mobile repeater for receiving and transmitting wireless signals, said repeater comprising:
   a battery powered transceiver for receiving and transmitting wireless signals and being joined to a frame;
   at least three pods of legs depending from said frame in a downward direction, said pods being disposed in a triangular configuration comprising a first forward pod, a second forward pod and a rearward pod, said first forward pod and said second forward pod defining a chord therebetween and a longitudinal axis perpendicular thereto, said longitudinal axis intercepting said rearward pod;
   two battery powered vibratory motors mounted on said frame, a first battery powered vibratory motor operably associated with said first forward pod to impart vibrations thereto and a second battery powered vibratory motor operably associated with to said second forward pod to impart vibrations thereto;
   a battery powered microcontroller for controlling said transceiver, said first motor and said second motor; and
   a battery in electrical communication with said microcontroller, said transceiver, said first motor and said second motor.

2. A repeater according to claim 1 wherein said frame comprises a shell encasing said transceiver, said microcontroller and said battery therein.

3. A repeater according to claim 2 wherein said frame comprises a shell encasing said transceiver, said microcontroller, said battery and said motors therein.

4. A repeater according to claim 3 wherein said shell has a round footprint.

5. A repeater according to claim 4 having an aspect ratio of about 1.5 to about 5.

6. A repeater according to claim 5 wherein each said motor has a rotatable shaft, said shaft being mounted at an angle relative to the longitudinal axis ranging from about 30 to about 45 degrees.

15

7. A repeater according to claim 6 wherein each leg of said pluralities of legs is straight, downwardly oriented and rearwardly oriented at an angle ranging from about 16 degrees to about 30 degrees relative to a flat support surface.

8. A repeater according to claim 5 wherein said round footprint of said shell has a center, said center and said chord defining an included angle therebetween ranging from 70 to 80 degrees.

9. A mobile repeater for transmitting and receiving wireless signals, said repeater having a longitudinal axis defining a forward direction and a rearward direction opposed thereto, said repeater comprising:
- a shell having at least three spaced legs downwardly cantilevered therefrom, said legs being disposed in a triangular configuration and comprising at least one rearward leg juxtaposed with said longitudinal axis, and a first forward leg and a second forward leg, each said forward leg depending downwardly and rearwardly from said shell to define a longitudinally perpendicular chord, said first forward leg and said second forward leg each being independently vibratorily responsive to vibrational input from a respective first means for inducing vibrations therein and a respective second means for inducing vibrations therein, whereby said repeater moves forward in response to simultaneously induced vibrations in said first forward leg and said second forward leg and said repeater moves towards the direction of a still forward said leg in response to vibrations induced in the other said forward leg;
- a battery powered microcontroller for controlling said transceiver, said first leg vibration inducing means and said second leg vibration inducing means; and
- a battery in electrical communication with said microcontroller, said transceiver, said first motor vibration inducing means and said second motor vibration inducing means.

10. A repeater according to claim 9 wherein said first vibration inducing means and said second vibration inducing means comprise mutually identical 2.5 V to 5V eccentric load motors.

11. A repeater according to claim 10 wherein said repeater has a floor pan and a first housing and a second housing fixedly joined to an underside of the floor pan, each said housing having a said respective motor disposed therein and a respective said at least one leg cantilevered outwardly therefrom.

12. A repeater according to claim 9 wherein said first vibration inducing means and said second vibration inducing means comprise mutually identical piezoelectric crystals.

13. A repeater according to claim 12 wherein each said forward pod comprises 4 depending tapered legs and said at least one rearward leg is a single leg generally perpendicular to the support surface.

16

14. A repeater according to claim 9 weighing from about 55 to about 95 grams and having a power to weight ratio of about 2 to abut 5 watts/gram.

15. A repeater according to claim 14 having a forward speed of about 15 mm/sec to about 30 mm/sec with said first means for inducing vibrations and said second means for inducing vibrations simultaneously driven.

16. A plurality of substantially identical, spaced apart repeaters independently controllable from a single base station, each said repeater of said plurality of repeaters being suitable for wireless line of sight communication and comprising:
- a plurality of independently controllable locomotion means for inducing vibrations in a like plurality of pods of legs, each said pod of legs ratcheting against a support surface in response to vibrations from a said respective locomotion means in order to propel said repeater in response to a command signal from said base station;
- a transceiver configured for communicating with at least two other repeaters in a line of sight;
- a microprocessor for controlling said plurality of independent locomotion means and said transceiver;
- a battery for providing power to said transceiver, said microprocessor and said plural locomotion means;
- a frame for holding said plural pods of legs, said plural locomotion means, said microprocessor, said transceiver and said battery in fixed relationship, whereby each said repeater can move according to a signal transmitted from another repeater of said plurality and having a line of sight communication therewith.

17. A plurality of substantially identical repeaters according to claim 16 wherein a first said repeater is movable towards a second repeater in responsive to a command signal transmitted from said base station through at least one other said repeater to said first repeater, thereby maintaining line of sight communication between said first repeater and said second repeater, neither said first repeater or said second repeater being direct communication with said base station.

18. A plurality of substantially identical repeaters according to claim 17 wherein said repeaters are configured to operate at the same time in response to command signals from said base station.

19. A plurality of substantially identical repeaters according to claim 18 wherein a subset of said plurality of repeaters further comprises a shell, said shell being aesthetically configured to be disguised as a common item indigenous to a hostile environment wherein said subset of repeaters is disposed.

20. A plurality of substantially identical repeaters according to claim 19 wherein said wireless line of sight communication comprises a 2.4 GhZ or a 5 GHz signal.

\* \* \* \* \*